United States Patent [19]

Solow

[11] Patent Number: 4,798,066
[45] Date of Patent: Jan. 17, 1989

[54] AUTOMOBILE IGNITION LOCK COVER WITH CHAIN AND BRACKET MOUNTING

[75] Inventor: Joseph E. Solow, Plainview, N.Y.
[73] Assignee: Wolo Manufacturing Corporation, Deer Park, N.Y.
[21] Appl. No.: 152,636
[22] Filed: Feb. 5, 1988
[51] Int. Cl.⁴ .............................................. B60R 25/02
[52] U.S. Cl. .................................... 70/212; 70/237; 70/420
[58] Field of Search .............. 70/428, 424, 423, 427, 70/212, 18

[56] References Cited

U.S. PATENT DOCUMENTS

| | | | |
|---|---|---|---|
| 1,283,493 | 11/1918 | Garner | 70/237 |
| 3,916,658 | 11/1975 | Barry | 70/417 |
| 4,008,589 | 2/1977 | Harrell | 70/424 |
| 4,074,550 | 2/1978 | Rowlings | 70/237 |
| 4,103,524 | 8/1978 | Mitchell | 70/209 |
| 4,118,921 | 10/1978 | Lee | 70/237 |
| 4,187,706 | 2/1980 | Hill | 70/428 |
| 4,282,730 | 8/1981 | Lipschutz | 70/184 |
| 4,304,111 | 12/1981 | Nolin | 70/212 |
| 4,317,346 | 3/1982 | Gutman | 70/238 |
| 4,404,822 | 10/1983 | Green | 70/233 |
| 4,490,997 | 1/1985 | Hughes | 70/233 |
| 4,494,391 | 1/1985 | Solow | 70/428 |
| 4,505,140 | 3/1985 | Solow | 70/424 |
| 4,559,795 | 12/1985 | Zagoroff | 70/422 |
| 4,658,613 | 4/1987 | Solow | 70/427 |
| 4,712,639 | 12/1987 | Solow | 180/287 |

OTHER PUBLICATIONS

Brochure, Steadfast 1985, Packaging for Cuff Lock CL-007.

Primary Examiner—Robert L. Wolfe
Attorney, Agent, or Firm—Brumbaugh, Graves, Donohue & Raymond

[57] ABSTRACT

An automobile ignition lock cover for steering column-mounted ignition locks includes a hollow cover housing having an open side to fit over the ignition lock. An L-shaped bracket has a first portion disposed inside the housing and fixed to the back wall of the housing. It also has a second, outside bracket portion that extends out through a slot in the lower portion of the cover. A chain is attached to the upper end of the cover. The free end of the chain is attached to the U-shaped shackle of an adjustable shackle lock assembly. The chain wraps around the steering column, and the shackle legs are inserted through one or a pair of holes in the outside bracket portion and locked snugly in place in the lock housing, which bears against the opposite side of the bracket or is attached thereto. The L-portion of the bracket is disposed inside the cover and extends forward under the ignition lock, to prevent the cover from being rotated.

8 Claims, 4 Drawing Sheets

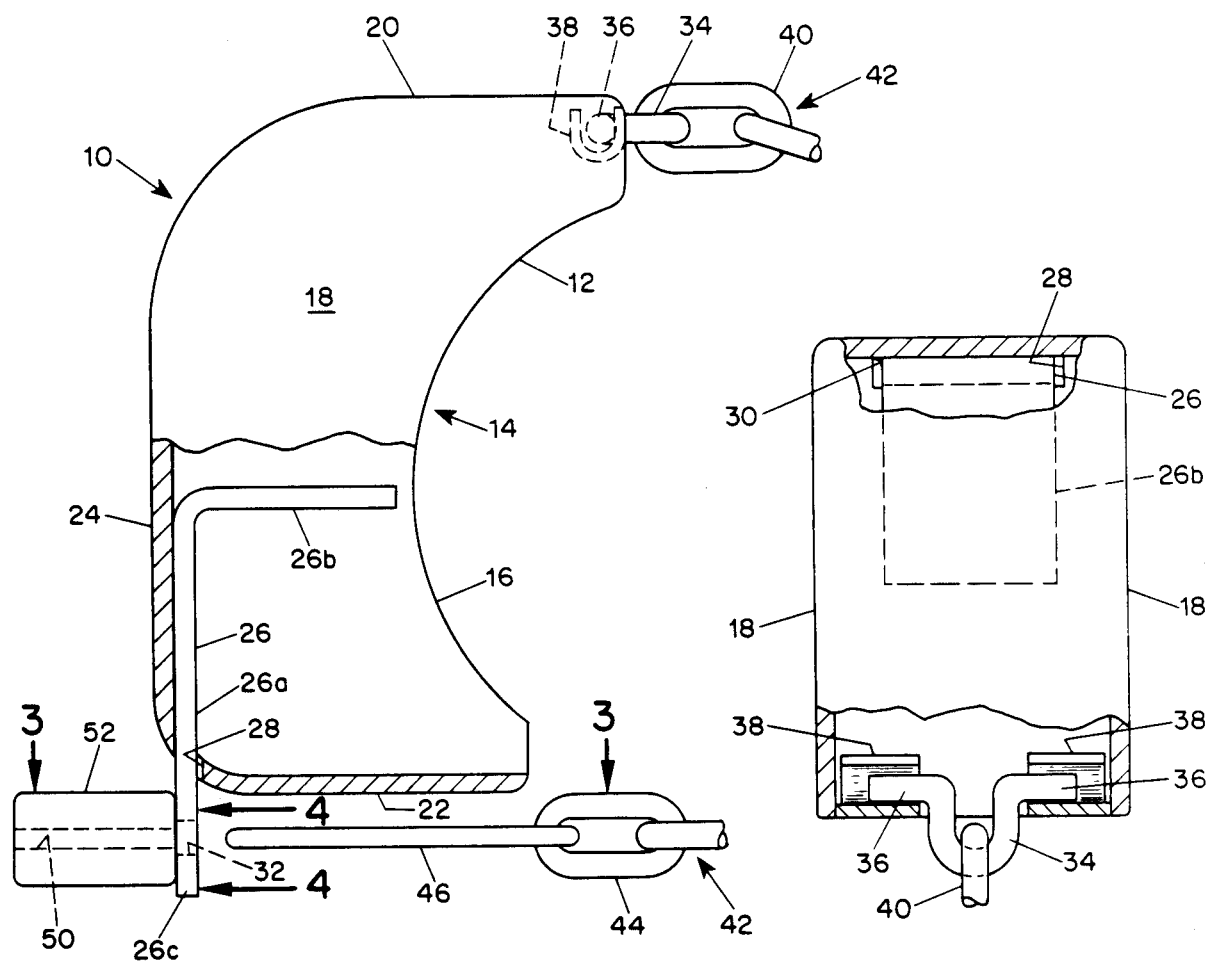
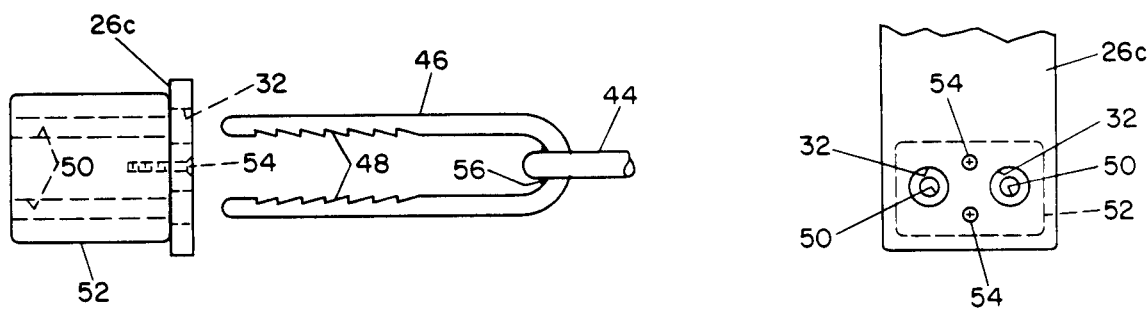
FIG. 1     FIG. 2
FIG. 3     FIG. 4

AUTOMOBILE IGNITION LOCK COVER WITH CHAIN AND BRACKET MOUNTING

FIELD OF INVENTION

The present invention is a new and improved ignition lock cover for automobiles having ignition locks mounted on the steering column.

BACKGROUND OF THE INVENTION

Automobile theft continues to be a major problem in this country and others. Ignition locks in themselves offer little protection, in that it is easy to jump-star the car under the dashboard or hood, anywhere along the path of the ignition wires, thus by-passing the ignition lock. As a result, most car manufacturers place the ignition lock in the steering column and use the lock not just to disable the ignition but also to lock the steering wheel. Even if the car is jump started, it cannot be driven because the steering wheel remains locked.

But, steering column ignition locks, in practice, offer little protection from professional car thieves. Such individuals have learned how to defeat the locks quickly and easily, for example by using a dent puller to forceably remove the entire lock housing from the steering column.

Wolo Manufacturing, Inc. manufactures a steering lock cover, under the trademark Auto Watchman, which fits over a steering column-mounted ignition lock and offers an effectuve deterrent from tampering. The cover, which is described further in my prior U.S. Pat. No. 4,494,391, has an open side with arcuate edges that fit snugly against the side of the steering column. A double-strand link chain is attached to the top of the cover and wraps around the steering column. The free end of the chain slides into the bottom end of the cover out through a narrow slot so that it can be pulled taut. A lock mechanism contained inside the cover engages the chain to secure it in place.

This device is extremely resistent to tampering, since the cover lock and the mechanism for engaging the chain are both secure within the protective cover housing. Also, the bottom wall of the cover itself is utilized to help secure the chain in place. Because the cover lock is located inside the cover housing just below the steering column lock, it has the side benefit of preventing the cover from being rotated about the steering column.

My prior U.S. Pat. No. 4,505,140 describes a steering lock cover which employs the same type of protective housing, but with a simpler and less costly way of securing the free end of the chain to the bottom of the cover. In this configuration, I provide a pair of holes in the cover bottom wall and maneuver the U-shaped shackle of a conventional padlock into the holes. The shackle is welded in place so that the body of the lock is outside the cover. The chain, which may be a simple link chain, can thus be attached and removed simply by unlocking the padlock.

In mounting the device of my '140 patent, the chain is pulled taut around the steering column, and the link closest to the open shackle leg is placed over the shackle. The ability to select different links along the chain provides adjustability to accomodate steering columns of different diameters or to accomodate the extra chain length needed to direct the chain about obstacles on the column, such as the base of the turn signal lever. But, in most instances some slack will remain in the chain after it is locked. Also, in order to attach the chain it and the cover must be held against rotation while the attaching link is maneuvered onto the lock shackle, which makes it somewhat more awkward to attach than the Auto Watchman.

U S. Pat. No. 4,008,589 discloses a steering lock cover which is held on by a chain and in which the chain is adjustable in length. To do this, the fixed end of the chain is attached to a bolt which is held by a nut on a bracket extending from the cover. The free end of the chain is received in a slot in another bracket extending from the opposite end of the cover.

While the use of a bolt permits the effective length of the chain to be finely adjusted, and while the accompanying bracket, which extends out away from the cover and steering column post, may facilitate attaching the free end of the chain, these same features result in drawbacks as to the desirability and effectiveness of the device. First, the need for providing two brackets, and a cooperating nut and bolt assembly, is costly. Second, the nut and bolt assembly is exposed. Third since both brackets are cantilevered off the cover housing, and since the chain is attached to portions of the brackets that extend radially outward it may be possible to bend the brackets tangentially and free up the device. Fourth, the chain must still be pulled tight through the slot and held tight while attaching a padlock, which may be awkward, since the chain, the cover, and a padlock must all be held separately at the same time.

SUMMARY OF THE INVENTION

An automobile ignition lock cover according to the invention includes a hollow cover housing having an open side to fit over the ignition lock. A bracket has a first portion disposed inside the housing and fixed to the back wall of the cover, and a second, outside bracket portion that extends out through a slot in the lower portion of the cover. A chain or other flexible tension bearing element is fixed to the upper end of the cover housing. An adjustable shackle and lock assembly, in which a U-shape shackle is received in the lock housing and adjustable at a plurality of axial positions, releasably attaches the free end of the chain to the outside bracket portion for adjusting the effective length of the chain.

Preferably the bracket is L-shaped, including a portion inside the cover that projects forward at right angles to the back wall, toward the steering column. The L portion is positioned so that the ignition lock fits between the cover top wall and bracket L portion, thereby inhibiting rotation of the cover about the steering column. Preferably also, the outside bracket portion has one or more holes to receive the shackle. Optionally, the lock is mounted on the outside bracket portion so as to retain it in place when the cover is not mounted on the steering column.

DESCRIPTION OF THE DRAWINGS

FIG. 1 is a side view, partially in section, of a first embodiment of the invention;

FIG. 2 is a top view, partially broken away, of the device of FIG. 1;

FIG. 3 is a top view, taken in the direction of lines 3—3 of FIG. 1, of the locking configuration for the device of FIG. 1;

FIG. 4 is a rear view, taken in the direction of lines 4—4 of FIG. 1, of the lower portion of the bracket and lock housing of FIG. 1;

DETAILED DESCRIPTION OF THE PREFERRED EMBODIMENTS

Figure 5:
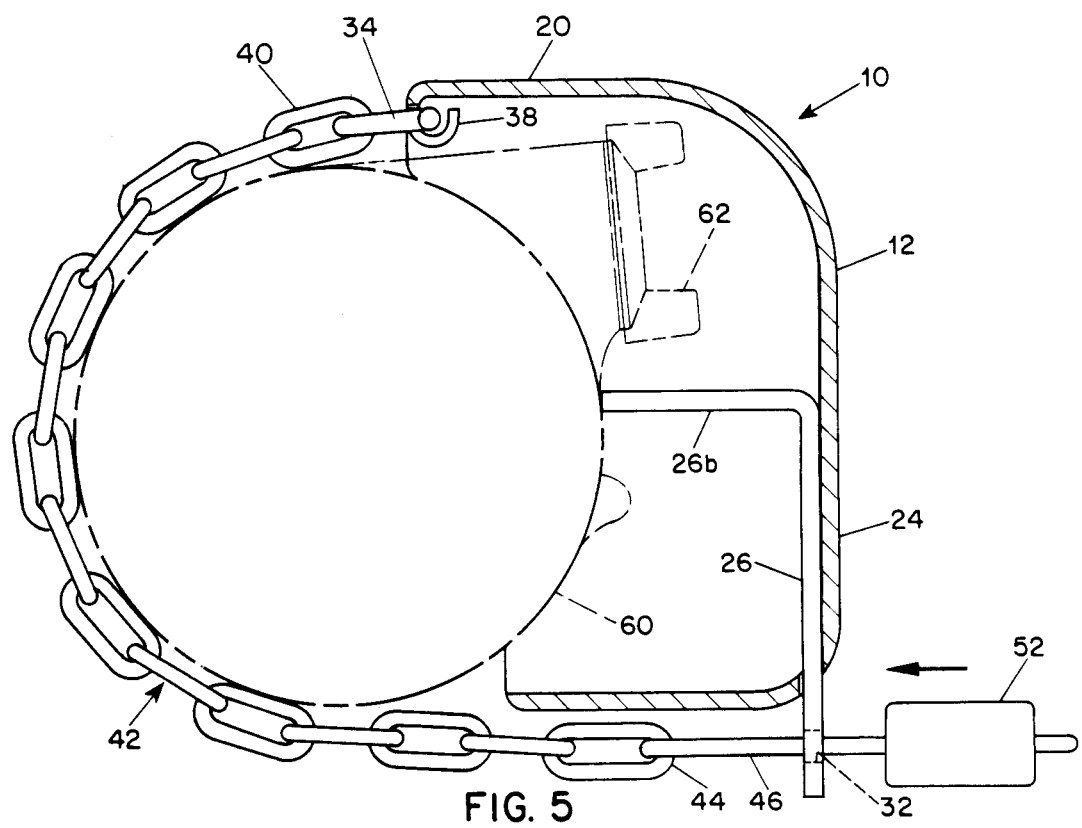
FIG. 5 is an opposite side view of an alternative embodiment of the invention, shown mounted on an automobile steering column.

An automobile ignition lock cover 10, as shown in FIG. 1, includes a housing 12 which is open on one side 14, the open side having a pair of arcuate edges 16 that are adapted to abut the side of an automobile steering column (see FIG. 5). The housing includes an opposed pair of sidewalls 18, top and bottom walls 20 and 22, respectively, and a back wall 24. An L-shape bracket 26 is disposed in the interior of the cover housing 12 and includes a first portion 26a that extends on the inside surface of the back wall 24, a second portion 26b that extends forward from the back wall 24 at approximately a right angle, and an outside bracket portion 26c that extends out through a slot 28 in the cover. The bracket 26 is fixed to the back wall 24, for example by welding, as shown by 30. The inside surface of the back wall 24 is preferably planar so that bracket portion 26a abuts the inside surface. The portion 26b extends forward to a position near, but short of the arcuate edges 16. The portion of the bracket 26 which lies outside of the cover housing 12, i.e., outside bracket portion 26c, has a pair of holes 32, preferably horizontally spaced apart.

A yoke 34, with outturned ends 36, is secured to the upper end of the cover housing 12, for example by bending inwardly and upwardly tab portions 38 on the forward end of the housing 12. The yoke 34 secures the end link 40 of one end of a chain 42.

The end link 44 of the opposite end of the chain engages the shackle 46 of a conventional double-leg shackle, adjustable lock assembly. In such assemblies, the shackle 46 is U-shaped, with each leg of the shackle including a series of longitudinally spaced serrations 48. The shackle legs are received in a pair of holes 50 in the lock housing 52, which can lock the shackle at any point along the serrations. Such locks are well known and need not be described further here.

In this embodiment, the lock housing 52 is attached to the rear face of the bracket portion 26c, for example by screws 54, so that the lock holes 50 are aligned with the bracket holes 32. To reduce alignment problems during assembly, the holes 32 in the bracket may be slightly oversized compared with the lock holes. Also, for convenience end link 44 of the free end of the chain 42 is fixed to the shackle 46, for example by welds 56.

In the embodiment 10a of FIG. 5, wherein like numbers designate like elements, lock housing 52 is not attached to the bracket 26, but remains a free element.

Figure 6:
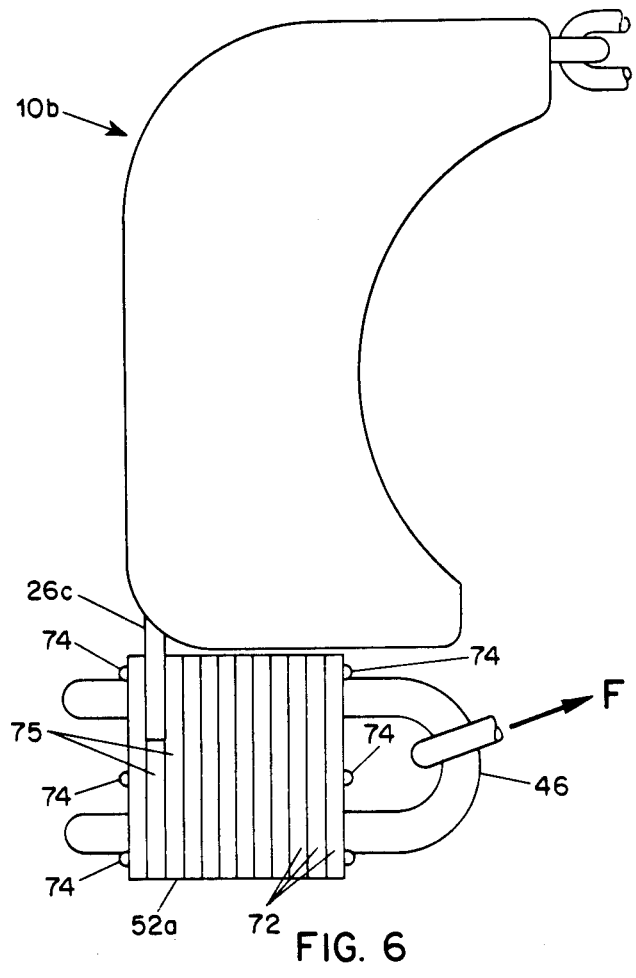
FIG. 6 is a side view of a third embodiment.

FIG. 6 shows an alternative way to mount the lock housing 52a to the outside bracket portion 26c. In this embodiment 10b, the lock housing 52a is made of a series of stacked plates 72, which are held together by rivets 74, in a known configuration. In mounting the housing 52a, the rivets 74 are removed, and portions of several of the interior plates 75 are removed. The housing 52a is then reassembled, with bracket 26c sandwiched between plates 72 and abutting plates 75, as shown in FIG. 6. Bracket portion 26c is provided with holes to cooperate with the holes in the plates for the shackle leg and rivets. The rivets 74 are at that point replaced to re-construct the housing 52.

With reference to FIG. 5, the cover 10 is mounted on an automobile steering column, shown in phantom as 60, by positioning the cover housing over the steering column ignition lock 62 such that the ignition lock 62 lies between the L bracket portion 26b and the cover top wall 20. The shackle 46 and chain 42 are wrapped around the steering column 60 and the legs of shackle 46 are inserted through the bracket holes 32. In the case of the embodiment of FIGS. 1-4 and 6, the shackle at the same time is inserted into the cooperating holes 50 in the lock housing 52. In the case of FIGS. 5, the lock housing slides on separately. The shackle 46 and lock housing 52 are then pulled together tightly until the chain is snug around the steering column.

In either case, the use of an adjustable lock assembly 46, 52 effectively makes the chain adjustable in length. The chain is easy to mount, since in all the embodiments it is relatively slack when the shackle is inserted through the bracket holes and into the lock. The shackle itself acts as a support guide when tightening the chain, which means it can be done easily with one hand. This is further facilitated by the bracket portion 26b, which helps to hold the cover against rotation relative to the ignition lock 62.

The cover according to this invention is simple in construction and inexpensive to manufacture, and at the same time very secure. As can be seen from FIG. 5, any tampering force applied to the chain causes the bracket 26 to pivot against the back wall 24 of the cover housing. The portion 26b welded to the cover 12 is disposed inside the housing 12, protected from tampering. Since only a short section, portion 26c, of the bracket extends from the housing, it is difficult to bend. Outside bracket portion 26c is even more difficult to bend in the case of FIG. 6, since tampering tends to apply a somewhat upward force on the chain, as shown by arrow F, which tends to bend the lock housing into the bottom wall 22.

The invention can be made from conventional components, e.g., a standard link chain, L-bracket, and adjustable shackle and lock assembly. If desired, the conventional lock housing 52 can be adapted so that it can be attached to the bracket 26, for example by screws as shown in FIGS. 1-4, by removing part of the lock housing, as shown in FIG. 6, or by other methods. Also, as shown by FIG. 5, a conventional lock assembly can be employed, if desired, without attaching the lock housing 52 to the bracket. It may be slightly less convenient for the user to have a separate lock piece 52, however functionally FIGS. 1 and 5 operate in the same manner. Once assembled, the assembly (except for the shackle) can be dip coated in rubber or plastic so as to prevent marring the steering column surface.

Figure 7:
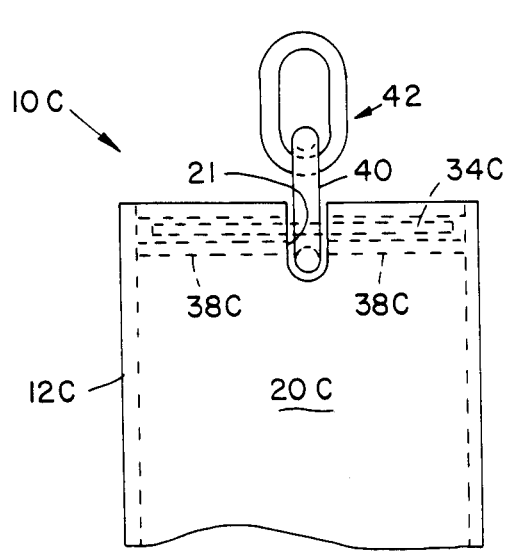
FIGS. 7-8 are and side views of the upper portion of the cover, showing an alternative embodiment for securing the chain.
Figure 8:
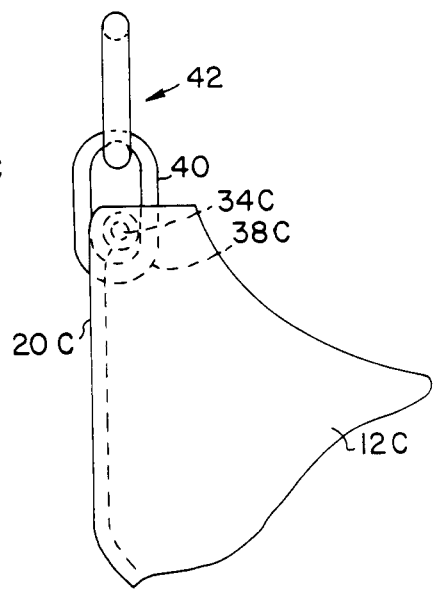

FIGS. 7-8 illustrate an alternative embodiment 10c for securing the upper link 40 of the chain 42. The cover 12c upper end has tabs 38c that are bent around a bar 34c to hold it in place. The bar extends through the link 40, which is located between the tabs. A cutout 21 may be provided in the top surface 20c of the cover to accomodate the link 40.

The foregoing represent preferred embodiments of the invention. Variations and modifications of the embodiments shown and described will be evident to persons skilled in the art. For example, flexible tension bearing elements other than the chain shown in FIGS. 1 and 5, and other means of attaching the upper end of the tension bearing element to the housing, may be employed. Also, while shackle 46 is welded or otherwise attached to link 44 for convenience, it is not necessary to do so. It may also be possible to reverse the position of the shackle and lock housing, with the shackle being coupled to the bracket and the lock housing being coupled to the chain. Moreover, while it is preferable to provide either one or a pair of holes in the bracket, other means may be employed to engage the lock. All such modifications and variations are intended to be within the scope of the invention, as defined in the following claims.

I claim:

1. An automobile steering column ignition lock cover comprising:

a cover housing having upper and lower ends defined by top, bottom, and back walls, and further having a pair of opposed sidewalls, wherein the top and bottom walls and sidewalls form an open front side, wherein the sidewalls have edges adapted to rest against an automobile steering column, wherein the housing has a hollow interior for fitting over a steering column-mounted ignition lock; and wherein the housing has a slot in the lower end adjacent to the back wall;

a bracket member having a first portion disposed in said interior and being affixed to said back wall and an outside bracket portion which extends through said slot to the exterior of said housing, said outside bracket portion having means for engaging an adjustable shackle and lock assembly;

a flexible tension bearing element having first and second ends;

means for attaching the first end to the upper end of the cover housing;

an adjustable shackle and lock assembly means for releasably securing the second end of the flexible tension bearing element to said outside bracket portion, wherein said assembly includes a U-shape shackle and a lock housing means for receiving the shackle and for securing the shackle at a plurality of axial positions for adjusting the position of said second end relative to said bracket.

2. An ignition lock cover as defined in claim 1, wherein the bracket is L-shaped, wherein the L-portion of the bracket is disposed in the interior of the cover housing, extends away from said back wall, and is positioned such that the ignition lock fits between the cover top wall and the bracket L portion.

3. An ignition lock cover as defined in claim 2, wherein said U-shaped shackle is coupled to the second end of the tension bearing element, and wherein the outside bracket portion has at least one hole for receiving a leg of said shackle.

4. An ignition lock cover as defined in claim 3, wherein the outside bracket portion has a pair of holes for receiving the legs of the U-shape shackle.

5. An ignition lock cover as defined in claim 4, wherein the outside bracket portion has rearward facing side, wherein said lock housing means has a lock housing and a pair of holes therethrough for receiving said shackle and comprising means for mounting the lock housing to the rearward facing side such that the lock housing holes and bracket holes are aligned.

6. An ignition lock cover as defined in claim 5, wherein the L bracket portion extends substantially perpendicular to said back wall.

7. An ignition lock cover as defined in claim 1, wherein said lock housing means comprises a plurality of plate elements stacked perpendicular to a lock housing axis, said plate elements having axially aligned holes for receiving the shackle; wherein a portion of one or more of said plates is removed to define an opening extending perpendicular to said axis, wherein said outside bracket portion extends into said opening and is sandwiched between adjoining plate elements, wherein said outside bracket portion includes a hole aligned with axially aligned holes of said plates, and comprising means for securing said plate elements to one another and to said outside bracket portion.

8. An ignition lock cover as defined in claim 1, wherein the tension bearing element is a chain having an end link, wherein the cover housing top wall has a front edge, and wherein the means for attaching the first end of the chain to the upper end of the cover housing comprises a bar disposed in the interior of the cover housing and extending through the end link, and a pair of tabs projecting from the front edge of the cover housing and bent under and around the bar, on either side of the end link, for securing the bar in place.

* * * * *